United States Patent [19]

Schwartz

[11] Patent Number: 5,255,947
[45] Date of Patent: Oct. 26, 1993

[54] LIFTING AND INVERTING DEVICE FOR CYLINDRICAL CONTAINERS

[76] Inventor: Peter J. Schwartz, 5704 16th St. NW., Washington, D.C. 20011

[21] Appl. No.: 950,675

[22] Filed: Sep. 25, 1992

[51] Int. Cl.⁵ .................. B65D 63/18; B65G 7/12
[52] U.S. Cl. .................. 294/31.2; 294/150; 294/153; 294/165
[58] Field of Search ........ 294/15, 27.1, 31.2, 294/34, 68.26, 74, 141, 142, 149–157, 162–168; 16/114 R, 114 A; 215/100 A; 220/94 R, 694, 737; 222/465.1, 466, 467

[56] References Cited

U.S. PATENT DOCUMENTS

| | | | |
|---|---|---|---|
| 1,839,636 | 1/1932 | Baker | 294/31.2 X |
| 2,090,979 | 8/1937 | Johansen | 294/27.1 |
| 2,480,129 | 8/1949 | Gebler | 294/74 X |
| 2,532,306 | 12/1950 | Herbert | 294/150 |
| 3,600,734 | 8/1971 | Pollinger | 294/162 X |
| 3,794,370 | 2/1974 | Lockhart et al. | 294/31.2 |
| 4,537,436 | 8/1985 | Pfortmiller | 294/150 |
| 4,834,438 | 5/1989 | Haidet | 294/31.2 |
| 4,856,836 | 8/1989 | Delphin | 294/74 |

Primary Examiner—Johnny D. Cherry
Attorney, Agent, or Firm—Sughrue, Mion Zinn Macpeak & Seas

[57] ABSTRACT

A device for lifting and inverting water bottles. A pair of straps have their ends secured to a handle. Each strap passes through a tightening element and a pair of adjusting elements and around the bottle. An open slip knot is formed using the two straps. In operation the device is oriented with each rope end on one side of the bottle having passed around the bottle and through an oppositely positioned adjusting element. The bottle may be carried upright. To invert, the adjusters are repositioned on the same side and the straps pass around the bottle at a position near the bottom. The bottle may be lifted and inverted using the device as a pivot for such motion.

4 Claims, 2 Drawing Sheets

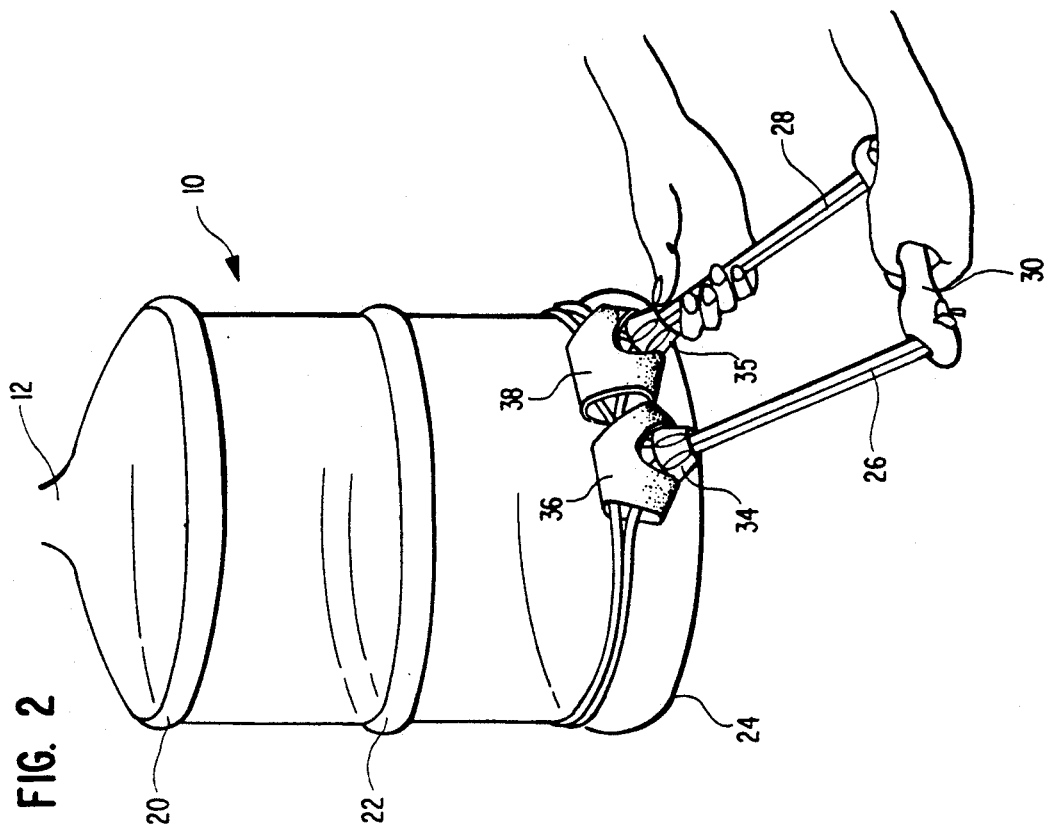
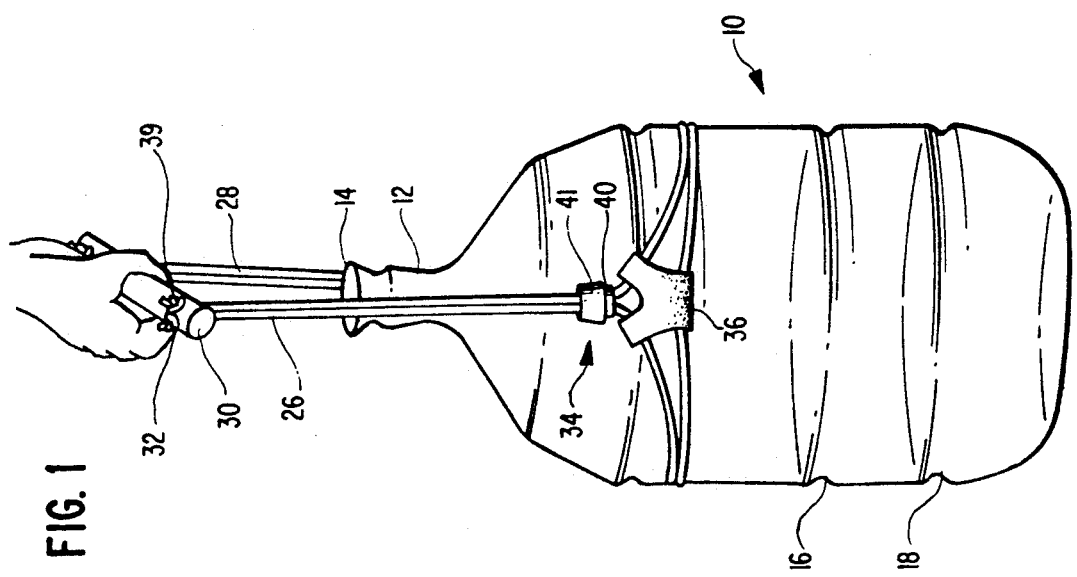

LIFTING AND INVERTING DEVICE FOR CYLINDRICAL CONTAINERS

BACKGROUND OF THE INVENTION

This invention relates to a device and its use for carrying and changing the position of a heavy article. In particular, this invention relates to a device used for lifting a cylindrical container such as a bottled water container and inverting it to a position of use on a dispenser-cooler.

The increased popularity of bottled water is well known. Given environmental concerns and the like, the use of bottled water has increased both in residential and business locations. Typically, bottled water containers are cylindrical vessels weighing over 40 pounds. They are awkward and heavy. In use, a bottle of water is taken from a storage position where it sits upright, moved, that is, carried, by an individual to the location where the dispenser is positioned and then lifted and inverted so that the bottle is placed, bottom side up, onto the water dispenser. The effort involved in lifting and inverting over 40 pounds of water is difficult for many in the population, women, children and elderly people.

This problem of moving the container and changing its orientation has existed within the art and a number of proposals have been suggested. To date none have solved the problem with a workable device.

U.S. Pat. No. 1,965,726 provides a rudimentary device for carrying large size bottles and the like. A more contemporary solution to the problem directed to bottled water containers is found in U.S. Pat. No. 4,834,438. In U.S. Pat. No. 4,834,438, a rigid yoke mechanism is placed around the bottle. It is secured by means of a cinch strap. The yoke has two arms at opposite sides of the bottle, one for the use of each individual.

In operation, the bottle is positioned in the yoke member and the strap is drawn tightly. Two individuals grasp the unit, lifting at each side and carry the bottle to the dispenser. The bottle is then rotated about the handles, so that the unit can be inverted and placed over the dispenser. The handles are positioned on the yoke substantially through the center of gravity of the bottle when filled to aid in the inversion process. While U.S. Pat. No. 4,834,438 defines one technique of solving the problem, it is expensive, bulky and preferably requires more than one individual.

SUMMARY OF THE INVENTION

Given the deficiencies of the prior art, it is an object of this invention to produce a device which is easy to use in the lifting and tilting of bottled water containers.

It is a further object of this invention to provide a device which is easy to manufacture, inexpensive and yet reliable in the lifting and inverting of bottled water containers.

Yet another object of this invention is to provide a device which can be used by one person easily, employing the leverage that one person can generate to change the orientation of a bottled water container from one of a carrying position to one allowing inversion into a water dispenser.

These and other objects of this invention are provided by a flexible strap device having two rope elements in an open slip knot configuration. The rope elements terminate at their distal ends at respective sides of a carrying handle. Each of the ropes passes through two rope clamps and two leather adjustment mechanisms to tighten and position the device at one section of the bottled water container.

With the adjusters and rope clamps positioned on opposite sides of the bottle, the unit may be employed to lift a bottle of water by the handle. By tightening the adjusters, the ropes then act as circumferential cinch straps with ends terminating above the opening of the bottle at the handle. In this orientation the bottle can be carried from a storage position to a location approximately above a cooler dispenser. The bottle may be carried by one person using one or two hands.

Inversion requires moving the adjustment members to a position where they are adjacent each other at a lower portion of the bottle. This is, the unit is slid down the bottle and the straps repositioned but locked in place. By tightening the clamps, the adjusters then act as a pivot point for inversion. Grasping the bottle by its neck with one hand and the handle with the other, the unit is lifted over the dispenser. As pouring commences, the unit is simply pivoted about the adjusters from a generally horizontal position into an inverted vertical position. By this technique, even pouring into the dispenser occurs without sudden movement or radical changes in position of the bottle.

An important aspect of this invention is that by enabling the user to carry the bottle with the unit using one hand, it is possible to open and close doors, negotiate obstacles or generally move the bottle from its storage location to the location of use without the necessity of having more than one person or repeatedly setting the bottle down and lifting it up again.

As will also be apparent from the description of the preferred embodiment that follows, another important advantage of this invention is that given its entirely flexible nature it can be stored with a minimal amount of space and can be made of lightweight, inexpensive materials. The unit is capable of performing both operations of carrying and inversion with a minimum of hardware elements.

BRIEF DESCRIPTION OF THE DRAWING

FIG. 1 is a side view of a preferred embodiment of this invention when placed around a bottle for lifting;

FIG. 2 is a side perspective view of a preferred embodiment of this invention repositioned about a bottle in preparation for a lifting and inversion operation;

DESCRIPTION OF THE PREFERRED EMBODIMENT

Figure 4:
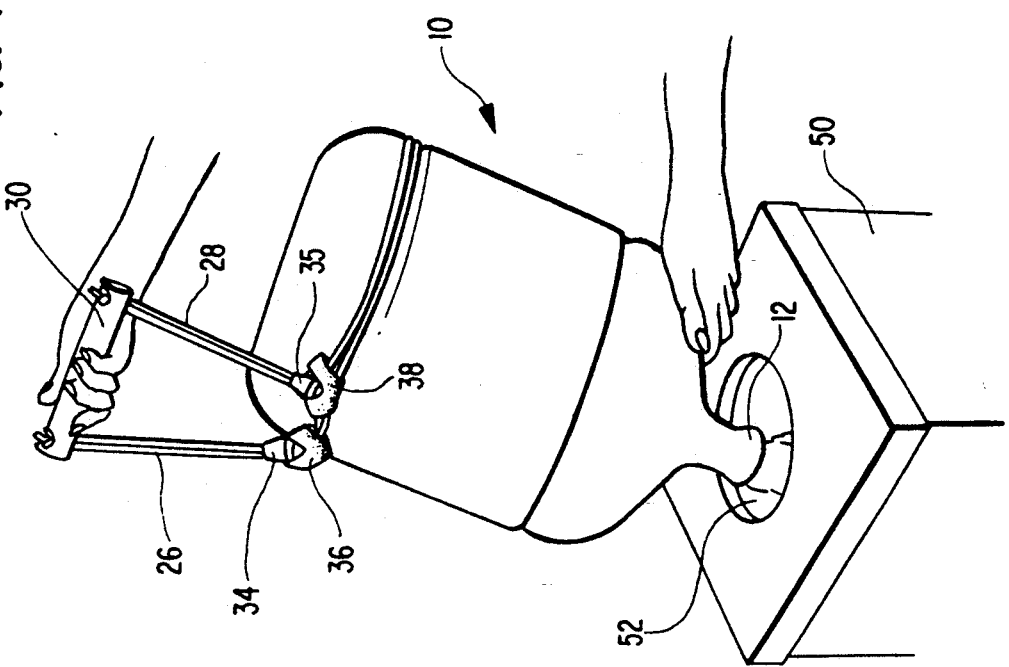
FIG. 4 is a side perspective view of this invention when inverted for positioning over and onto a dispenser/cooler.

Referring now to FIGS. 1-4 the preferred embodiment of this invention will be depicted.

A bottle of water 10, typically a large bottle of about 40 pounds in weight, is illustrated as element 10. The bottle is generally cylindrical having a tapered neck 12 and opening 14. The bottle generally has a series of circumferential grooves or ribs 16, 18 depending on the manufacturer. It will be understood that for purposes of this invention the bottle 10 is shown in an exemplary form, and that other additional configurations may be employed.

That is, while FIG. 1 illustrates the bottle 10 having a series of grooves 16 and 18, the bottle illustrated in FIG. 2 has a series of projecting ribs 20, 22 and an enlarged bottom portion 24.

Referring to FIGS. 1 and 2, the lifting device will now be explained. The device comprises a pair of straps 26, 28. These may be nylon ropes, webbing or the like. A handle 30 which may be made of a semi-rigid material forms the termination points for each of the ropes. Dealing first with the strap or rope 26, one end 32 is secured to the handle 30 by means of whipping a knot through each of the through-holes illustrated in FIG. 2. The rope 26 then passes through a first clamp 34, through a y-shaped adjuster element 36 and proceeds once around the bottle through a lower portion of a second adjuster 38, then back through the clamp 34 and to the handle 30 where it terminates in a second knot or stop 39.

The second strap or rope 28 follows a similar path on an opposite side and in an opposite direction around the bottle. It passes first through the clamp 35, through an upper portion of the adjuster 38, around the bottle through a lower portion of the adjuster 36, back up through an upper portion of the adjuster 38, through the clamp 35 and terminates at the handle 30. It will be appreciated that the ropes cross over each other around the bottle. It will also be appreciated that each rope passes through one of the clamps 34 and 35 twice such that each clamp can be used to cinch each rope individually.

The rope clamps 34, 35 may be conventional nylon compression clamps having a two-part construction. Conventionally, such a rope clamp has an inner compression piece 40 having serrations or other means for frictionally engaging the ropes. Threadably placed on the engaging frictional piece 40 is a screw member 41. By tightening member 41 over clamping member 40, the ropes are squeezed in the device until they are securely held. Such devices are well known and commercially available at hardware stores, outfitting shops, and the like.

The adjusters 36 and 38 may be formed of any flexible or semi-flexible materials such as plastic, leather, heavy gauge fabric and the like. Each of the elements 36 and 38 comprises a generally Y-shaped configuration having a lower portion through which the rope may pass generally through the unit and two upper arms through which the rope may pass and change its position. It will be appreciated that the configuration and shape of the adjusters 36 and 38 may be varied so long as the unit allows the rope to pass through the unit in one pass and yet have the ends pass through the unit as they terminate at the handle 30.

Referring now to FIGS. 1, 2, 3 and 4, the operation of this device will be explained. FIG. 1 illustrates the configuration of the device for carrying a bottle of water 10 from its storage position to a position illustrated in FIG. 4 where it is inverted and placed on the opening 52 of a dispenser-cooler 50.

As shown in FIG. 1, the lifting device is placed over the top of a bottle, that is, over the neck portion 12 as the bottle sits upright. The adjusters 36 and 38 are placed on opposite sides of the bottle 10 and the rope clamps 34, 35 are tightened down. While FIG. 1 illustrates schematically one side of the bottle, it will be appreciated that from an opposite side the elements 35 and 38 would also be positioned as illustrated. With the ropes 26 and 28 positioned either under a ridge or in an indentation in the bottle 10, the straps are cinched. The unit is ready to be lifted, as illustrated in FIG. 1. In this configuration, the bottle can be conveniently carried by one hand on the handle 30. This permits the individual to open doors, move around desks and the like for stability while carrying the heavy bottle. When the bottle is going to be inverted over the cooler, as illustrated in FIG. 2, the unit is shifted from an upper position used for carrying to a lower position about the bottle for inversion. In this step of the operation, with the bottle sitting upright, the adjusters 36 and 38 are drawn together on one side of the bottle. The rope clamps, previously loosened to allow the adjusters to be moved, are then again tightened down. As illustrated in FIG. 2, the clamps 34 and 35 are positioned adjacent the adjuster elements 36 and 38. This provides a positive stop to prevent slippage of the rope elements 26 and 28.

Figure 3:
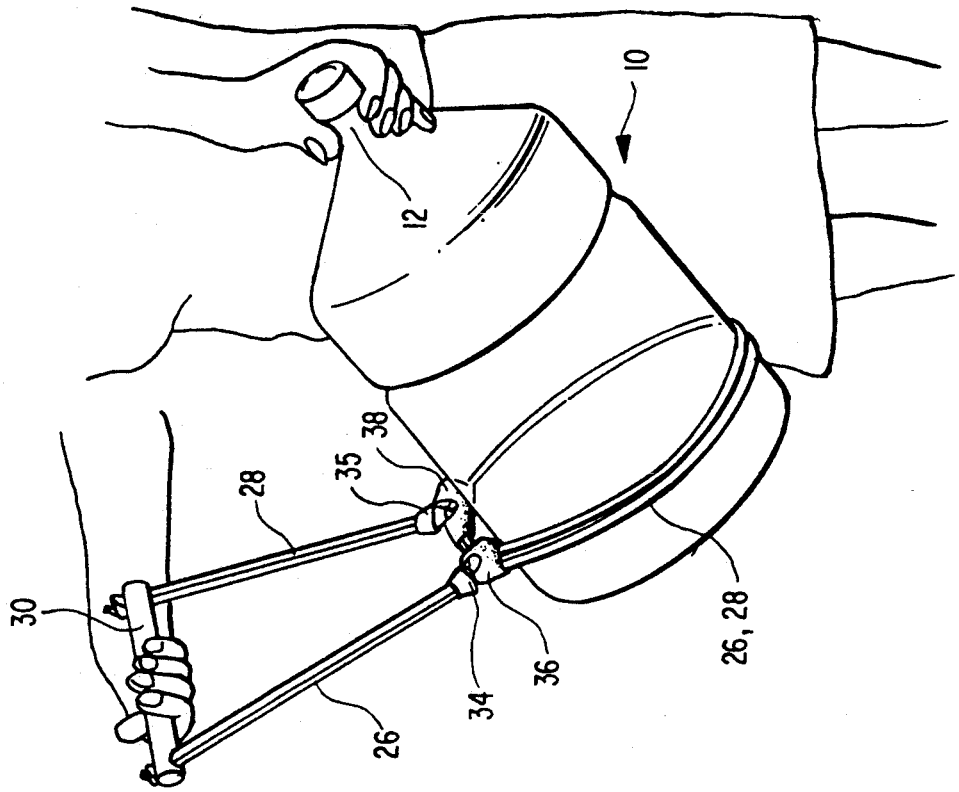
FIG. 3 is a side perspective view of a preferred embodiment of this invention when lifted in preparation for an inversion operation.

With the unit in the orientation illustrated in FIG. 2, the bottle is then lifted with two hands as illustrated in FIG. 3. One hand is used to grasp the neck 12 of the bottle while the other hand is placed on the handle 30. As will be apparent, with a full bottle of water the center of gravity is positioned between the two hands of the user.

The bottle is then lifted to a position over the opening 52 and by shifting the action from the hand over the neck 12 to that on the handle 30, the unit can be lifted and tilted, at the same time inverting the bottle uniformly and evenly into the dispenser. This operation is illustrated in FIG. 4.

Thereafter, the rope clamps 34 and 35 are loosened, the adjusters are also loosened and the device removed from the bottle. Given the fact that it is made out of flexible rope or strap elements, it can be conveniently stored near the dispenser, or near the location where the bottles themselves are stored in a very compact manner.

It would be appreciated by those of working skill that modifications of this invention are within the scope thereof.

Having defined my invention, I claim:

1. A device for lifting and tilting a water bottle comprising:
   a handle,
   a pair of straps having their ends attached to said handle,
   a pair of strap locking devices, each strap locking device having two portions of the same strap passing therethrough, and
   a pair of strap adjusting devices slidably mounted on said straps, each of said straps passing through each of said strap adjusting devices, said strap locking devices positioned in proximity to said strap adjusting devices to limit sliding movement, whereby when said strap adjusting devices are positioned at opposite sides of said bottle, said bottle may be carried, and when said straps are repositioned on said bottle and said strap adjusting devices are repositioned adjacent each other, the bottle may be tilted.

2. The device of claim 1, wherein each of said strap adjusting devices comprises a hollow member having openings defining three passages, two of said passages for opposite portions of one of said straps to pass through and guiding said opposite portions to one of said strap locking devices and a third passage for the other of said straps to pass through said adjusting device.

3. The device of claim 1, wherein each of said strap locking devices comprises an inner compression member having an engagement portion for engagement with a respective strap and an outer locking portion engaging said compression member and urging said inner compression member into engagement with portions of said strap.

4. The device of claim 1, wherein said handle is a semirigid member having through-holes to receive ends of said straps.

* * * * *